(12) United States Patent
Mehta et al.

(10) Patent No.: US 8,643,342 B2
(45) Date of Patent: Feb. 4, 2014

(54) FAST CHARGING WITH NEGATIVE RAMPED CURRENT PROFILE

(75) Inventors: Vineet Haresh Mehta, Mountain View, CA (US); Jeffrey Brian Straubel, Menlo Park, CA (US)

(73) Assignee: Tesla Motors, Inc., Palo Alto, CA (US)

( * ) Notice: Subject to any disclaimer, the term of this patent is extended or adjusted under 35 U.S.C. 154(b) by 1031 days.

(21) Appl. No.: 12/651,246

(22) Filed: Dec. 31, 2009

(65) Prior Publication Data
US 2011/0156661 A1 Jun. 30, 2011

(51) Int. Cl.
*H02J 7/00* (2006.01)
*H02J 7/04* (2006.01)

(52) U.S. Cl.
USPC .......................................... 320/160; 320/162

(58) Field of Classification Search
USPC .................... 320/156, 157, 160, 162–164
See application file for complete search history.

(56) References Cited

U.S. PATENT DOCUMENTS

| | | | | |
|---|---|---|---|---|
| 4,952,861 A * | 8/1990 | Horn | | 320/133 |
| 5,237,259 A * | 8/1993 | Sanpei | | 320/158 |
| 5,508,598 A * | 4/1996 | Al-Abassy | | 320/129 |
| 6,087,810 A * | 7/2000 | Yoshida | | 320/139 |
| 6,476,585 B1 * | 11/2002 | Simmonds | | 320/162 |
| 6,664,765 B2 * | 12/2003 | Dotzler et al. | | 320/162 |
| 6,859,016 B2 * | 2/2005 | Dotzler | | 320/164 |
| 6,917,184 B2 * | 7/2005 | Lai et al. | | 320/125 |
| 7,671,564 B2 * | 3/2010 | Kamatani | | 320/128 |
| 7,692,407 B2 * | 4/2010 | Nozawa | | 320/137 |
| 7,705,563 B2 * | 4/2010 | Ibaraki | | 320/128 |
| 7,880,445 B2 * | 2/2011 | Hussain et al. | | 320/164 |
| 2007/0188139 A1 * | 8/2007 | Hussain et al. | | 320/128 |
| 2008/0197813 A1 * | 8/2008 | Asakura et al. | | 320/150 |
| 2009/0295338 A1 * | 12/2009 | Hawawini et al. | | 320/157 |
| 2012/0126820 A1 * | 5/2012 | Tan et al. | | 324/434 |

\* cited by examiner

*Primary Examiner* — M'Baye Diao
(74) *Attorney, Agent, or Firm* — J. Richard Soderberg

(57) ABSTRACT

A battery cell charging system, including a charger and a controller, for rapidly charging a lithium ion battery cell, the battery cell charging system having a circuit for charging the battery cell using an adjustable voltage charging-profile to apply a charging voltage and a charging current to the battery cell wherein the adjustable voltage charging-profile includes: a first charging stage with a constant first stage charging current and an increasing battery cell voltage with the first stage charging current provided until the first stage charging voltage is about equal to a first stage complete voltage less than a maximum battery cell voltage; an intermediate ramped charging stage, the intermediate ramped charging stage including both an increasing ramped voltage and a decreasing ramped iBat current for the battery cell for the voltage charging range of the first stage complete voltage to about the maximum battery cell voltage; and a final charging stage with a constant final stage charging voltage about equal to the maximum battery cell voltage and a decreasing final stage charging current with the final stage charging voltage provided until the final stage charging current reaches a desired charge complete level.

13 Claims, 5 Drawing Sheets

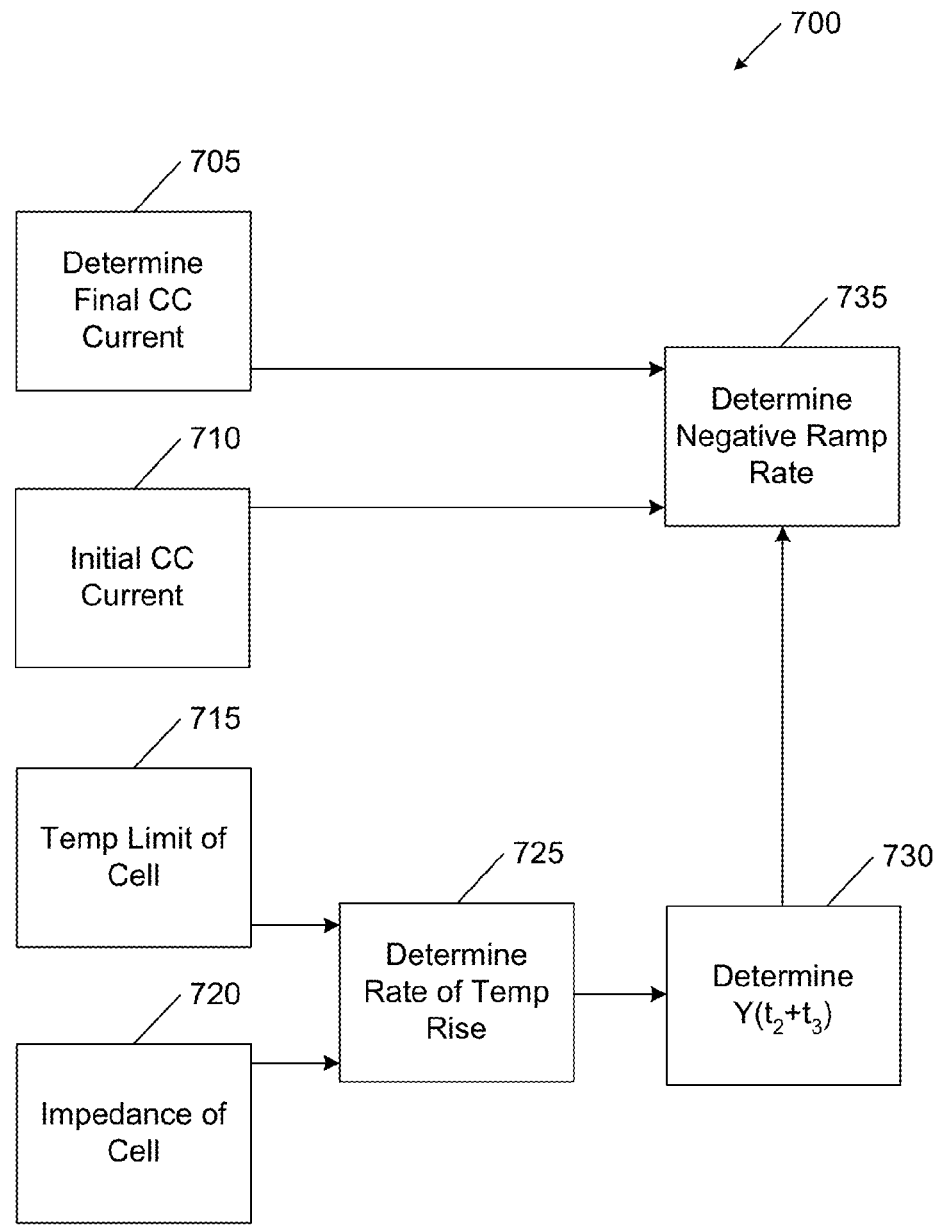
FIG_7

FAST CHARGING WITH NEGATIVE RAMPED CURRENT PROFILE

CROSS REFERENCE TO RELATED APPLICATIONS

This application is related to U.S. application Ser. No. 12/505,256 filed 17 Jul. 2009, the contents of which are all expressly incorporated herein for all purposes.

BACKGROUND OF THE INVENTION

The present invention relates generally to rechargeable lithium-ion-type chemistry batteries, and more specifically to fast charging of automotive Li-ion battery packs.

Lithium ion batteries are common in consumer electronics. They are one of the most popular types of battery for portable electronics, with one of the best energy-to-weight ratios, no memory effect, and a slow loss of charge when not in use. In addition to uses for consumer electronics, lithium-ion batteries are growing in popularity for defense, automotive, and aerospace applications due to their high energy and power density. However, certain kinds of treatment may cause Li-ion batteries to fail in potentially dangerous ways.

One of the advantages of use of a Li-ion chemistry is that batteries made using this technology are rechargeable. Traditional charging is done with a two-step charge algorithm: (i) constant current (CC), and (ii) constant voltage (CV). In electric vehicles (EVs), the first step could be constant power (CP).

Step 1: Apply charging current limit until the volt limit per cell is reached.

Step 2: Apply maximum volt per cell limit until the current declines below a predetermined level (often C/20 but sometimes C/5, C/10, and even C/50 or other value).

The charge time is approximately 1-5 hours depending upon application. Generally cell phone type of batteries can be charged at 1 C, laptop types 0.8 C. The charging typically is halted when the current goes below C/10. Some fast chargers stop before step 2 starts and claim the battery is ready at about a 70% charge. (As used herein, "C" is a rated current that discharges the battery in one hour.)

Generally for consumer electronics, lithium-ion is charged with approximate 4.2±0.05 V/cell. Heavy automotive, industrial, and military application may use lower voltages to extend battery life. Many protection circuits cut off when either >4.3 V or 60° C. is reached.

Battery chargers for charging lithium-ion-type batteries are known in the art. As is known in the art, such lithium ion batteries require constant current (CC) and constant voltage (CV) charging. In particular, initially such lithium ion batteries are charged with a constant current. In the constant current mode, the charging voltage is typically set to a maximum level recommended by the Li-ion cell manufacturer based on safety considerations, typically 4.2V per cell. The charging current is dependent on cell chemistry, impedance, pack and charger design, required charge time, and system cost. Once the battery cell voltage rises sufficiently, the charging current drops below the initial charge current level. In particular, when the battery cell voltage Vb approaches the charging voltage Vc, the charging current tapers according to the formula: $I=(Vc-Vb)/Rs$, where I=the charging current, Vc=the charging voltage, Vb=the battery cell open circuit voltage and Rs=the resistance of the charging circuit including the contact resistance and the internal resistance of the battery cell. As such, during the last portion of the charging cycle, typically about the last ⅓, the battery cell is charged at a reduced charging current, which means it takes more time to fully charge the battery cell.

The closed-circuit voltage represents the voltage of the battery cell plus the voltage drops in the circuit as a result of resistance in the battery circuit, such as the battery terminals and the internal resistance of the battery cell. By subtracting the closed-circuit voltage from the open-circuit voltage, the voltage drop across the battery resistance circuit elements can be determined.

Various known battery chargers use this voltage drop to drive the battery charging voltage during a constant current mode in order to increase the Amperes (A) applied to the battery cell during a constant current mode. By increasing the A applied to the battery cell during a constant current mode, the battery cell is charged much faster.

The prior art includes lithium ion battery charger circuits that compensate for the voltage rise in the battery circuit in order to increase the charging current and thus decrease the charging time for a lithium ion battery. The compensation circuit can be based on an assumed initial voltage drop across the various resistance elements in the circuit and compensates for this voltage drop to maintain a predetermined charging current during a constant current charging mode. Unfortunately, the resistance of the various resistance elements change over time due primarily to various aging factors. Accordingly, in time, the charging time of the battery cell increases.

"Fast" charging of a battery, one or multiple cells, actually can mean many different things in a specific context beyond simply charging a battery as quickly as possible to the greatest amount of charge into the battery in a given time. The present invention relates to fast charging in a particular context and the co-filed related and incorporated patent application relates to fast charging in another particular context.

The present context for fast charging relates to a total time to fully charge the battery (as fully charged means in the particular application) while the context of the related application relates to a time to get to a "drive off" voltage (which sometimes is defined as about ~85% full charge. The problems are different, hence There is a need to further reduce a time for fully charging lithium-ion batteries.

BRIEF SUMMARY OF THE INVENTION

Disclosed is a battery charger and battery charging process for reducing a time for fully charging lithium-ion batteries. The preferred embodiments include a battery cell charging system, including a charger and a controller, for rapidly charging a lithium ion battery cell, the battery cell charging system having a circuit for charging the battery cell using an adjustable voltage charging-profile to apply a charging voltage and a charging current to the battery cell wherein the adjustable voltage charging-profile includes: a first charging stage with a constant first stage charging current and an increasing battery cell voltage with the first stage charging current provided until the first stage charging voltage is about equal to a first stage complete voltage less than a maximum battery cell voltage; an intermediate ramped charging stage, the intermediate ramped charging stage including both an increasing ramped voltage and a decreasing ramped iBat current for the battery cell for the voltage charging range of the first stage complete voltage to about the maximum battery cell voltage; and a final charging stage with a constant final stage charging voltage about equal to the maximum battery cell voltage and a decreasing final stage charging current with the final stage charging voltage provided until the final stage charging current reaches a desired charge complete level.

The intermediate stage may be implemented as a plurality of uniform ramped stepwise changes, the intermediate stage may be responsive to an $R_{Bad}$ value determined for the battery cell, and current or power may be ramped. Embodiments also include charging methods using a ramped intermediate stage.

As noted above, typically, a li-ion battery cell is charged using a two step CC-CV (constant-current constant voltage) algorithm. For high energy cells, CC is typically 1 C or less and CV is between 4.1V and 4.2V.

When chargers and charging methods of the prior art are used for fast charging, cycle life degradation that occurs when the cell is charged at high rates (above 1 C for typical consumer 18650 cells and other energy cells) and at high voltages as the prior art inventions mentioned previously. By modifying the apparatus and process to include a four (or more) steps cycle life degradation even at 2 C charge rates is reduced. The multistate charge-profile as follows was employed with minimal cycle degradation: 2 C, 4.0V (hold until 0.7 A), 0.7 A, 4.2V (CC-CV-CC-CV). While an n-step adjustable charge profile (n=4) is described, n may have other values. Prior art systems use a two-stage profile having a constant current stage 1 applied until cell voltage limit is reached, and then a constant voltage stage 2 at max cell voltage is applied until a "full" charge is reached. The present embodiments insert one or more intermediate charging stages that improve charging rate without degrading battery performance. The intermediate stages include one or more of constant voltage stages (iBat is decreasing) or constant current as battery charge voltage increases or an intermediate stage where higher current is used due to the cell chemistry or the temperature that happens to occur at some point during charge.

In a particular implementation, the battery may be modeled to decrease charging current as battery voltage increases. The model may include an $R_{Bad}$ that allows improved charging rates without the negative consequences. The model would represent $R_{Bad}$ as a function of the various physical parameters that can negatively affect cycle life. For example, $R_{Bad}$ could partially represent the polarization of the negative electrode ($R_{anode}$). As $R_{anode}$ increases, the likelihood of lithium plating on the anode is increased, thereby leading to capacity fade in the battery. So from a modeling perspective, the parameters that affect $R_{anode}$, such as temperature, cell age and state of charge can appropriately be adjusted in the charge algorithm to prevent cell damage. There are several examples of these physical, cell level parameters that affect $R_{Bad}$ such electrolyte type, electrode design, and anode material. All of these parameters can be experimentally determined and therefore properly modeled to show their effect on a $R_{Bad}$ value.

One source of capacity degradation consequent to fast charging results from side reactions in the negative electrode (i.e., lithium plating). Reducing the charge voltages when charge rates are high minimizes the side reactions and thereby reduces degradation due to fast charging using high charging currents.

Other advantages of the present invention will be seen by review of the present disclosure.

BRIEF DESCRIPTION OF THE DRAWINGS

FIG. 7 is a process control diagram.

DETAILED DESCRIPTION OF THE INVENTION

Embodiments of the present invention provide a system and method for a fast battery charger, particularly for lithium-ion battery cells while reducing/eliminating the impact of fast charging on cycle life. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

Figure 1:
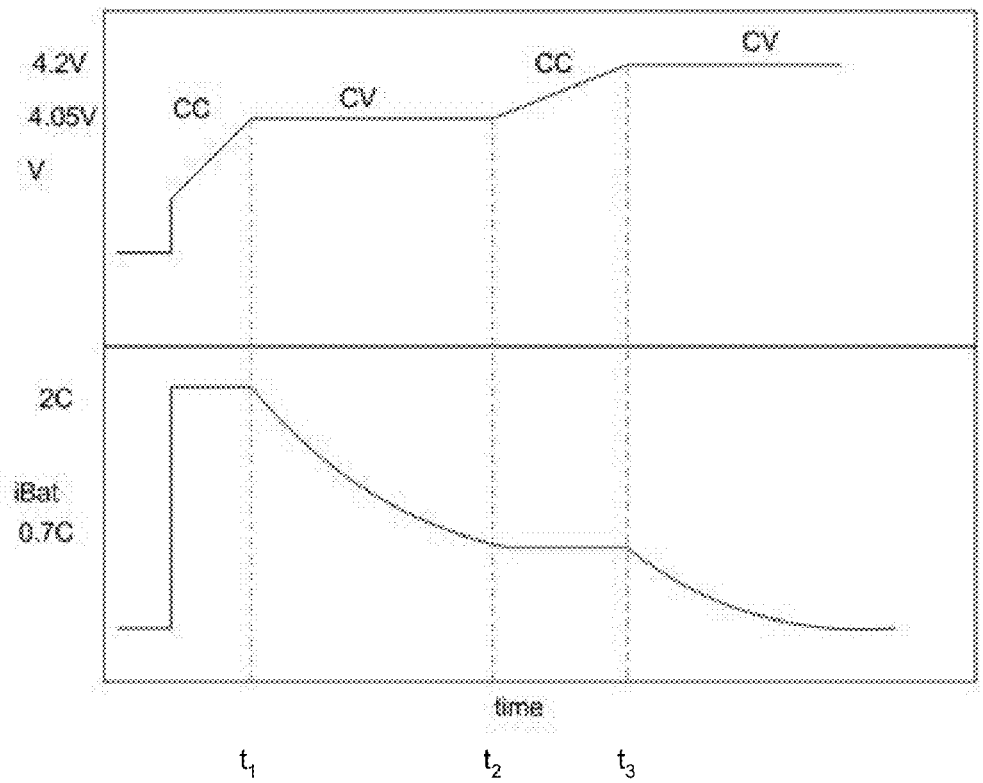
FIG. 1 is a chart of a simplified multistage (4 stage) fast charge profile for a battery charger.

FIG. 1 is a chart of a simplified multistage fast charge profile for a battery charger. The preferred embodiment for the fast charge profile includes at least four stages: a CC (constant current) first stage, a constant voltage (CV) second stage; a CC third stage, and a CV fourth stage.

The first stage includes CC at a level greater than the typical prior art value of 1 C. The first stage voltage varies from an initial value less than the cell target voltage to about 4.0V to about 4.05V. These are representative values but the actual value depends upon an impedance of the battery cell being charged. A lower impedance battery cell is able to be charged at higher voltages without degradation. The actual value also depends upon the maximum cell voltage, so the first stage target voltage may be a percentage of the maximum voltage, for example 80% SOC.

The second stage includes CV at the charging voltage level reached at the end of the first stage (e.g., 4.0-4.05 volts). During the second stage, the charging current declines from the first stage value of (preferably) 2 C to about 0.7 C.

The third stage includes CC at the second stage level while the charging voltage of the third stage increases to about the cell target voltage.

The fourth stage includes CV at about the cell target voltage while the charging current of the fourth stage declines. When the charging current of the fourth stage declines below a predetermined level, then the charging cycle is complete. These values are determined by application, typically C/10, sometimes C/5 or C/20. In an EV, C/70 could be the charging level. Three times are identified on FIG. 1—including $t_1$, $t_2$, and $t_3$. $T_1$ is the time for the conclusion of the first stage, $t_2$ is the time for the conclusion of the second stage, and $t_3$ is the time for the conclusion of the third stage.

Figure 2:
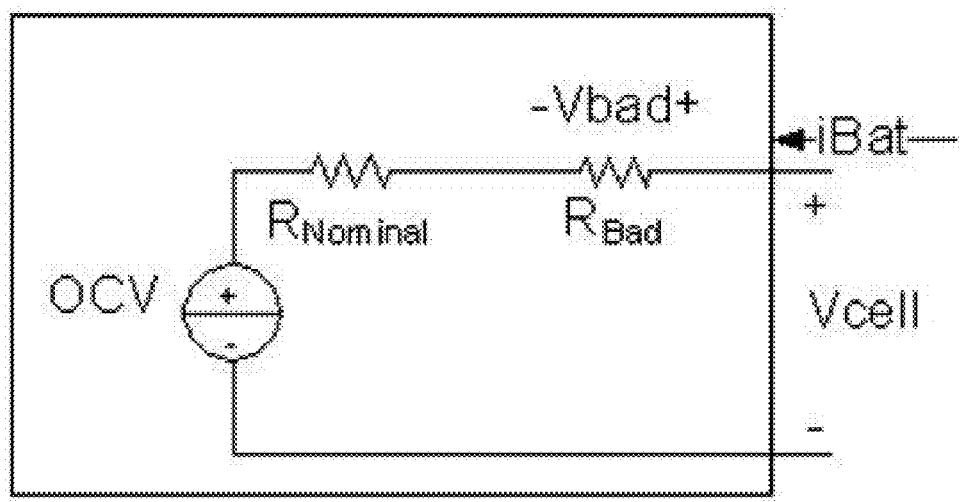
FIG. 2 is a schematic diagram of a DC model of a lithium-ion battery cell including an imaginary $R_{Bad}$ element.

FIG. 2 is a schematic diagram of a DC model of a lithium-ion battery cell including an imaginary $R_{Bad}$ element. The use of the $R_{Bad}$ element permits a different embodiment to produce a continually variable voltage charging profile as compared to FIG. 1 that produces a similar performance but may result in improved cycle life by lowing a voltage point where a final voltage taper begins. $R_{Bad}$, by taking into account battery age or a high impedance state, improves cycle life because lithium plating occurrence is directly related to battery age and the high impedance state.

In general, as impedance increases (with age, cycles, low temperatures), the voltage target can decrease. $R_{Bad}$ is introduced into a DC battery cell model to describe a charging method that defines an adjustable voltage level and SOC (state-of-charge) point at which taper begins. The models for the battery (e.g., $R_{Bad}$ and $V_{Negative\_Anode}$) are ways to mathematically determine, and to use in control systems, when excessively high charging currents at those cell conditions may cause irreversible capacity loss.

Figure 3:
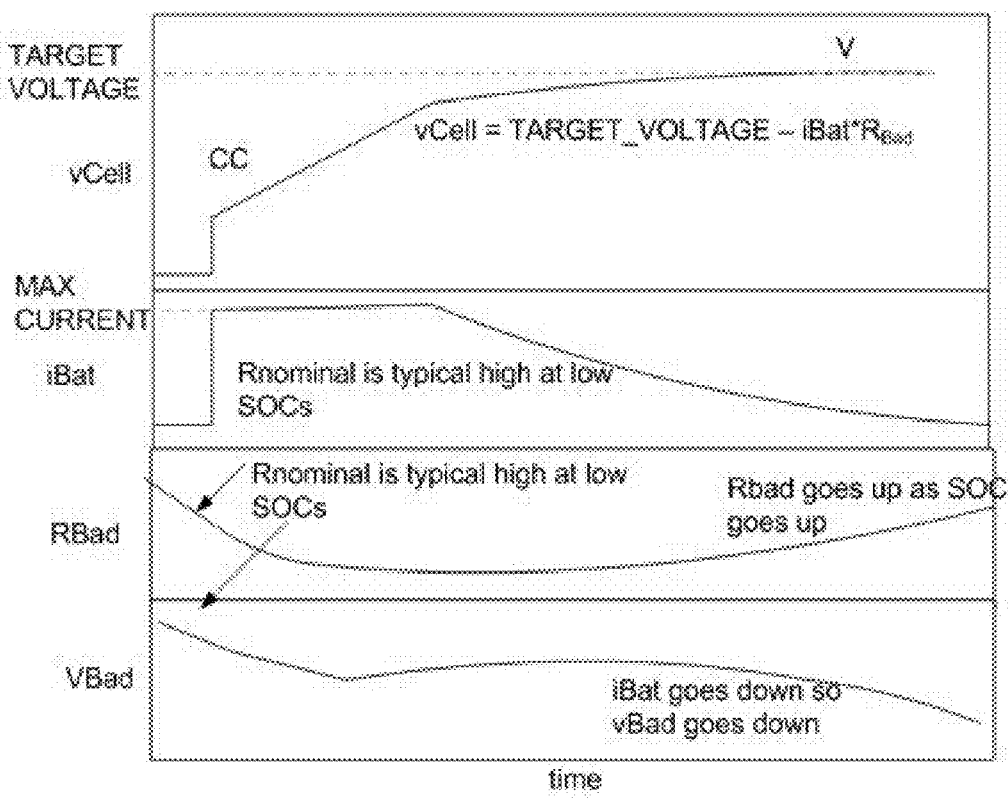
FIG. 3 is a variable fast charge profile for a battery charger responsive to the $R_{Bad}$ element shown in FIG. 2.

FIG. 3 is a variable fast charge profile for a battery charger responsive to the $R_{Bad}$ element shown in FIG. 2. Initially the profile includes a CC (or alternatively CP) at maximum current (which in some cases can be 5 C or greater) and an increasing charging voltage $V_{Cell}$. $V_{Cell}$ is equal to the target voltage minus iBat times $R_{Bad}$. The $R_{Bad}$ element controls the tapering of the charging current and the charging voltage because iBat decreases as $V_{Bad}$ goes down and $R_{Bad}$ goes up as SOC increases. These relationships are shown in FIG. 3.

$R_{Bad}$ of the preferred embodiment is based on a percentage of $R_{Nominal}$, such as $R_{Bad}=k1 \times R_{Nominal}+f(SOC)$ where f(SOC) is a function/lookup table using SOC as an input. For example, k1 is between 0 and 1 (typically around 0.1) and f(SOC) could be k2×SOC where k2 is typically around 0.001/SOC %. More generically, $R_{Bad}$ may be described as a function g(SOC, Temperature, $R_{Nominal}$) and could also be a function of age, although typically as a battery ages its nominal impedance goes up. $R_{Nominal}$ varies based on battery cell temperature, age and SOC. $R_{Nominal}$ may be determined in different ways, such as, for example, by look-up table or calculated in real-time. Generally, $R_{Bad}$ is directly related to $R_{Nominal}$ and SOC and inversely related to temperature. With this approach targetV=TARGET_VOLTAGE–$V_{Bad}$. TARGET_VOLTAGE is the final voltage that one wants to achieve at the end of charge for each cell in the battery pack, typically 4.2V, and $V_{Bad}$ is iBat times $R_{Bad}$. Table I provides representative values in the example of an electric vehicle having a 4.18V target voltage and a 150 Ah capacity battery.

TABLE I

| SOC | $R_{Nominal}$ (mOhm) | $R_{Bad}$ (mOhm) | OCV | iBat | vBad |
|---|---|---|---|---|---|
| 0 | 6 | 0.6 | 3 | 150.0 | 0.090 |
| 10 | 4 | 0.41 | 3.4 | 150.0 | 0.062 |
| 20 | 3 | 0.32 | 3.5 | 150.0 | 0.048 |
| 30 | 2.5 | 0.28 | 3.6 | 150.0 | 0.042 |
| 40 | 2 | 0.24 | 3.7 | 150.0 | 0.036 |
| 50 | 1.5 | 0.2 | 3.8 | 150.0 | 0.030 |
| 60 | 1.5 | 0.21 | 3.85 | 150.0 | 0.032 |
| 70 | 1.5 | 0.22 | 3.9 | 150.0 | 0.033 |
| 80 | 1.5 | 0.23 | 4 | 104.0 | 0.024 |
| 90 | 1.5 | 0.24 | 4.1 | 46.0 | 0.011 |
| 100 | 1.5 | 0.25 | 4.18 | 0.0 | 0.000 |

Another implementation method is based on the estimated anode voltage referenced to Li+. It believed that, in present li-ion technology, fast charging damages the anode when its voltage drops towards 0V referenced to Li+. So $R_{Bad}$ could also be a function of $V_{Negative\_Electrode\_Loaded}$, where
$V_{Negative\_Electrode\_Loaded}=$
$V_{Negative\_Electrode\_ToLi}-$
current$\times r_{Negative\_Electrode}$.

Figure 4:
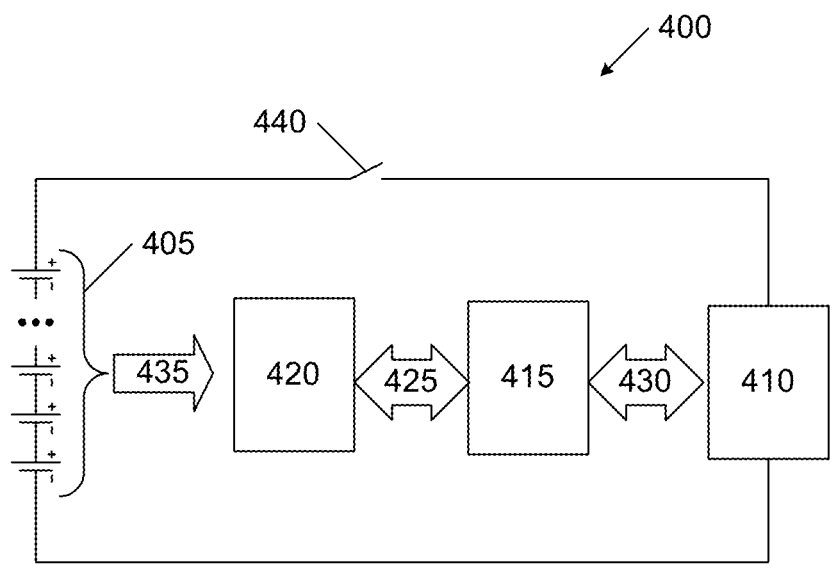
FIG. 4 is a representative charging system.

FIG. 4 is a preferred embodiment for a charging system 400, such as may be used in an electric vehicle. System 400 includes a battery 405, a charger 410 coupled to battery 405 and a battery management system (BMS) 415 and a battery data acquisition and monitoring subsystem 420. A communication bus 425 couples subsystem 420 to BMS 415 and a communication bus 430 couples BMS 415 to charger 410. A communication bus 435 couples battery data from battery 405 to subsystem 420.

Battery 405 is shown as a series-connected group of battery cells, however the arrangement of cells may be a combination of parallel/series connected cells of many different arrangements. Charger 410 of the preferred embodiment provides the charging current applied to battery 405. BMS 415 controls the charging current according to a profile established by the embodiments of the present invention. Subsystem 420 acquires the desired data as described herein regarding battery 405. For example, voltage, SOC, temperature, and other applicable data used by BMS 415. In some embodiments, subsystem 420 may be part of BMS 415 and BMS 415 may be part of charger 410. One or more of charger 410, BMS 415, and subsystem 420 control a switch 440.

Figure 5:
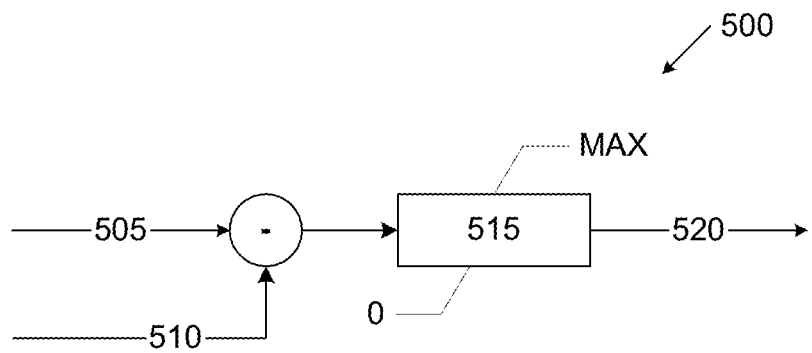
FIG. 5 is a control diagram for the charging system shown in FIG. 4.

FIG. 5 is a control diagram 500 for the charging system shown in FIG. 5. Diagram 500 describes a typical control system as may be used for charging lithium ion cells. A target voltage 505 and a maximum cell voltage 510 are subtracted and used by a controller 515 to produce a charging current 520. In prior art systems, current 520 is constant or compensates for an internal resistance (IR) drop of battery 405. As described above, the preferred embodiments of the present invention describe an adjusting charging current. In broad terms, as the voltage of the battery increases, the charging current decreases in a particularly controlled manner to provide for fast charging without degrading battery performance.

Figure 6:
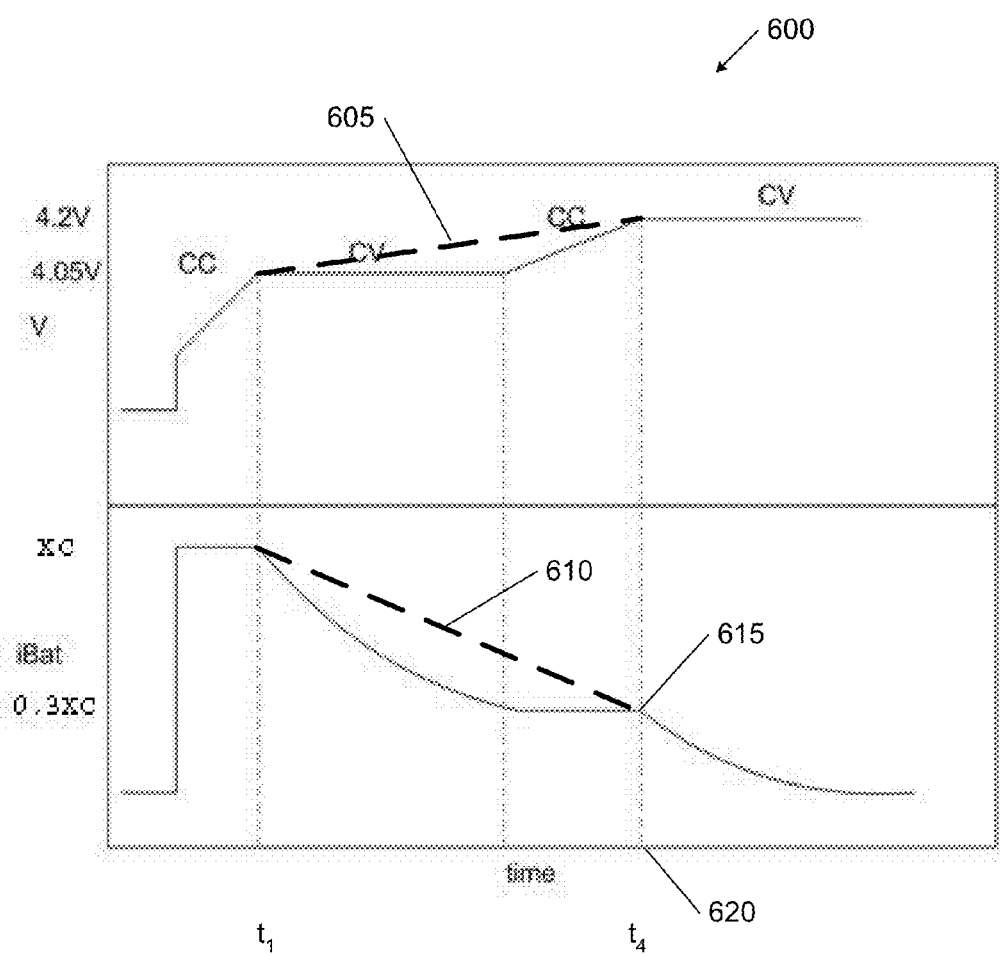
FIG. 6 is a modified ramped charge profile for a battery charger.

FIG. 6 is a modified ramped charge profile 600 for the charging system shown in FIG. 4. The previous discussion concerning FIG. 1 through FIG. 5 describes a novel battery charging system and method. FIG. 6 varies that apparatus and method to provide an alternative charging profile. FIG. 1 illustrates uses of a series of alternating constant-current and constant-voltage stages after the voltage reaches an initial target voltage (e.g., about 4.05 volts) until the final constant voltage stage at the battery target voltage (e.g., about 4.2 volts). The current $i_{Bat}$ has a characteristic "sagging" curve between the initial target voltage up to the start of the final constant current stage (when $i_{Bat}$ is relatively constant) until the start of the final constant voltage stage which is often referred to as the taper point.

As noted above, when one speaks of "fast charging" there are actually several aspects that may be relevant. In general, the question is how fast one gets to a desired charge level. With rechargeable batteries, there are different state of charge levels that are often used. For example, as shown in FIG. 1, the 4.05 volts for the battery charge is reached at the end of the first CC stage in a relatively short time. This state of charge may represent 80% of the battery capacity which is increased over the subsequent profile stages. The time to completely charge the battery is often significantly longer than the time to the completion of the first stage (time $t_1$).

The present context of fast charging seeks to shorten the time to completely charge the battery past the initial charge level. There have been many attempts to improve charge times, the following embodiments solve this problem in a novel and non-obvious way. The co-pending incorporated patent application includes embodiments that address degradation of the initial charge level due to aging of the battery. For conventional battery charging configurations, the voltage target level of the rechargeable battery at the end of the first CC stage is lowered as the battery ages to reduce degradation—the amount it is lowered is dependent upon $R_{Bad}$. For example, instead of being at 4.05 volts, the voltage may be 4.00 volts at the end of the first CC stage. Thus, in the same amount of time, less charge has been added to the battery.

Embodiments of the present invention address shortening the time to get the battery voltage back to any desired intermediate voltage level.

Profile 600 addresses the first type of improved charging system and replaces the one or more intermediate voltage stages shown in FIG. 1 with a ramped voltage stage 605 that begins at the initial target voltage and ends at the final voltage stage. Correspondingly, profile 600 replaces the characteristic $i_{Bat}$ curve during this procedure with a ramped current stage 610 that begins at time $t_1$ and ends at the beginning of the taper point 615 (time $t_4$). Profile 600, in most instances, has a different time at which the taper begins (identified as time 620 and also labeled $t_4$) as compared to the profile shown in FIG. 1 (in other words $t_4$ is earlier in time than $t_3$). Time 620 is often shorter than the time shown in FIG. 1 which a desirable alternative in many applications and is the goal and result of the present invention.

The constant control of voltage in intermediate stage 605 as the voltage ramps from the initial target of 4.05 volts to about 4.2 volts has $i_{Bat}$ also ramping from the initial high C charge level (e.g., XC which is often about 2 C but can be other values like 1 C in some applications depending upon several parameters (e.g., cell temperature) and design considerations) to the beginning of the taper (e.g., about 0.3XC or about 0.7 C amperes, though other values may be used). The constant smooth ramp for the voltage and current shown in FIG. 6 are idealized as in actual practice the values are a succession of very small stepwise adjustments of the voltage and current that approximate the smooth ramped profiles shown in FIG. 6. As the number of steps increases, the better the profile approximates the ramped response and the more efficient will be the charging profile. The preferred implementation includes very many uniform (uniform in step size, duration and in distribution) steps for the voltage and current ramp elements.

The ramp function has a finite slope, the slope being a function of a charge acceptance rate, internal impedance, temperature, and age. The slope is selected to get to the target value in the desired time, which will be shorter than the standard sagging profile. (There may be limits to the slope of this ramp function—such as temperature or other battery temperature.) As discussed above, these values change over time and the charging system is responsive to these values. The $R_{Bad}$ model discussed earlier is one way to model the changes in these and other variables impacting the slope. Part of the analysis of this implementation includes determining the desired charge goal and to set the current ramp to arrive at the goal (e.g., 4.2 volts). Some charging systems (e.g., the profile shown in FIG. 1) that include the sagging profile achieve the goal of 4.2 volts at the time shown by the third vertical dashed line in FIG. 1 ($t_3$) which is longer than the time 620 shown in FIG. 6.

FIG. 7 is a process control diagram for process control 700 for setting the slope of the ramped portion 610 shown in FIG. 6. Note that for purposes of ease of explanation, ramped portion 610 is shown as a smooth, single-slope line extending from XC at $t_1$ to 0.3XC at $t_4$. In practice, in addition to being a series of stepwise changes over these ranges, it is also possible to have multiple slopes resulting from feedback relating to charging performance and related parameters (e.g., battery cell temperature).

Process control 700 includes determining a final CC current (705), determining an initial CC current (710), retrieving a temperature limit of the cell (715) and retrieving an impedance of the cell (720). Temperature limit 715 and impedance 720 are used to determine a rate of temperature rise (725) which in turn sets a temperature-dependent function Y (730).

The function Y (730) and the final and initial CC currents are used to determine a negative ramp rate for the charging current (735). The negative ramp rate (735) is determined as:

$$\frac{CC_{Final} - CC_{Initial}}{Y(t_2 + t_3)}.$$

As noted above, for this application, a main goal is to charge a battery cell as quickly as possible to a "full" charge. As shown in FIG. 6, a first stage (from time zero to time $t_1$) is a constant current (CC) phase to a voltage ($V_{stage1}$) less than a final cell voltage. $V_{stage1}$ could be 4.0, 4.05, 4.5, or other value (4.05 is used in FIG. 6) and is preferably determined from or based on $R_{Bad}$ as described above.

Other systems would use a constant voltage (CV) stage for stage 2 which would let the current fall to a pre-determined current level (e.g., 0.7 C) responsive to the applied CV. This takes a certain amount of time (shown in FIG. 1 as the time $t_2$ minus $t_1$). After reaching this pre-determined current level, the system shown in FIG. 1 applies another CC stage in which the cell is charged to the desired final cell voltage (e.g., 4.2V). This also takes a certain amount of time (shown in FIG. 1 as the time $t_3$ minus $t_2$). At time $t_3$, a final CV stage is used to complete the charging process.

Preferred embodiments of the present include those that reach the pre-determined current level at time $t_4$ quicker than time $t_3$. One way to achieve this is to know the second CC rate (the value of the CC for the second CC stage–$CC_{Final}$) which is typically about 0.3 times the initial CC rate (the value of the CC for the first CC stage–$CC_{Initial}$) but can be another fraction in other applications.

Other useful data include a desired time to reach the final cell voltage and to start the final CV mode. $T_4$ could be as low as $\frac{1}{2}(t_2+t_3)$ or as high as $\frac{3}{4}(t_2+t_3)$. Considerations include that too fast a charge (perhaps less than $\frac{1}{2}(t_2+t_3)$) will lead to excessive heat generation and that too slow a charge (perhaps $\frac{3}{4}$ or $\frac{5}{6}(t_2+t_3)$ may not yield a significant enough improvement in charge time to warrant implementation.

One measure of an optimal fraction is to monitor battery cell temperature and ensuring that the battery cell temperature remains below a maximum temperature value (e.g., 50, 55, or 60° C.—which will depend at least on cell chemistry and specification). Knowing $CC_{initial}$, $CC_{Final}$, and $t_4$, one calculates $$\frac{CC_{Final} - CC_{Initial}}{t_4}$$

as the negative ramp rate (–Amperes/sec).

The –ve ramped rate could also be interpreted as a constant power charge step: CC=>CP=>CV (where previously it was CP=>CV). Maintaining a constant power will also achieve a similar objective as the previously described. The desired power level can be determined by a time desired to reach the final voltage and/or the number of total w–h (energy) desired into the battery before starting CV.

The system above has been described in the preferred embodiment of an embedded automobile (EV) electric charging system. The system, method, and computer program product described in this application may, of course, be embodied in hardware; e.g., within or coupled to a Central Processing Unit ("CPU"), microprocessor, microcontroller, System on Chip ("SOC"), or any other programmable device. Additionally, the system, method, and computer program product, may be embodied in software (e.g., computer readable code, program code, instructions and/or data disposed in any form, such as source, object or machine language) disposed, for example, in a computer usable (e.g., readable) medium configured to store the software. Such software enables the function, fabrication, modeling, simulation, description and/or testing of the apparatus and processes described herein. For example, this can be accomplished through the use of general programming languages (e.g., C, C++), GDSII databases, hardware description languages (HDL) including Verilog HDL, VHDL, AHDL (Altera HDL) and so on, or other available programs, databases, nanoprocessing, and/or circuit (i.e., schematic) capture tools. Such software can be disposed in any known computer usable medium including semiconductor (Flash, or EEPROM, ROM), magnetic disk, optical disc (e.g., CD-ROM, DVD-ROM, etc.) and as a computer data signal embodied in a computer usable (e.g., readable) transmission medium (e.g., carrier wave or any other medium including digital, optical, or analog-based medium). As such, the software can be transmitted over communication networks including the Internet and intranets. A system, method, computer program product, and propagated signal embodied in software may be included in a semiconductor intellectual property core (e.g., embodied in HDL) and transformed to hardware in the production of integrated circuits. Additionally, a system, method, computer program product, and propagated signal as described herein may be embodied as a combination of hardware and software.

One of the preferred implementations of the present invention is as a routine in an operating system made up of programming steps or instructions resident in a memory of a computing system as well known, during computer operations. Until required by the computer system, the program instructions may be stored in another readable medium, e.g. in a disk drive, or in a removable memory, such as an optical disk for use in a CD ROM computer input or other portable memory system for use in transferring the programming steps into an embedded memory used in the charger. Further, the program instructions may be stored in the memory of another computer prior to use in the system of the present invention and transmitted over a LAN or a WAN, such as the Internet, when required by the user of the present invention. One skilled in the art should appreciate that the processes controlling the present invention are capable of being distributed in the form of computer readable media in a variety of forms.

Any suitable programming language can be used to implement the routines of the present invention including C, C++, Java, assembly language, etc. Different programming techniques can be employed such as procedural or object oriented. The routines can execute on a single processing device or multiple processors. Although the steps, operations or computations may be presented in a specific order, this order may be changed in different embodiments. In some embodiments, multiple steps shown as sequential in this specification can be performed at the same time. The sequence of operations described herein can be interrupted, suspended, or otherwise controlled by another process, such as an operating system, kernel, and the like. The routines can operate in an operating system environment or as stand-alone routines occupying all, or a substantial part, of the system processing.

In the description herein, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

A "computer-readable medium" for purposes of embodiments of the present invention may be any medium that can contain, store, communicate, propagate, or transport the program for use by or in connection with the instruction execution system, apparatus, system or device. The computer readable medium can be, by way of example only but not by limitation, an electronic, magnetic, optical, electromagnetic, infrared, or semiconductor system, apparatus, system, device, propagation medium, or computer memory.

A "processor" or "process" includes any human, hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems.

Reference throughout this specification to "one embodiment", "an embodiment", or "a specific embodiment" means that a particular feature, structure, or characteristic described in connection with the embodiment is included in at least one embodiment of the present invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

Embodiments of the invention may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of the present invention can be achieved by any means as is known in the art. Distributed, or networked systems, components and circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope of the present invention to implement a program or code that can be stored in a machine-readable medium to permit a computer to perform any of the methods described above.

Additionally, any signal arrows in the drawings/Figures should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The foregoing description of illustrated embodiments of the present invention, including what is described in the Abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims. Thus, the scope of the invention is to be determined solely by the appended claims.

What is claimed as new and desired to be protected by Letters Patent of the United States is:

1. A battery cell charging system, including a charger and a controller, for charging a lithium ion battery cell, the battery cell charging system comprising: a circuit for charging the battery cell using an adjustable voltage charging-profile to apply a charging voltage and a charging current to the battery cell wherein said adjustable voltage charging-profile includes: a first charging stage with a constant first stage charging current and an increasing battery cell voltage with said first stage charging current provided until said first stage charging voltage is about equal to a first stage complete voltage less than a maximum battery cell voltage; a second ramped charging stage, said second ramped charging stage including both an increasing ramped voltage and a decreasing ramped iBat current for the battery cell for the voltage charging range of said first stage complete voltage to about said maximum battery cell voltage, the ramped iBat current starting to decrease at the constant first stage charging current, wherein said second ramped charging stage has a slope responsive to an imaginary resistance $R_{Bad}$ established for the battery cell; and a third charging stage with a constant third stage charging voltage about equal to said maximum battery cell voltage and a decreasing third stage charging current with said third stage charging voltage provided until said third stage charging current reaches a desired charge complete level.

2. The battery cell charging system of claim 1 wherein said second ramped charging stage includes a plurality of uniform stepwise voltage and current changes.

3. The battery cell charging system of claim 1 wherein said first stage charging current has a magnitude about equal to a number X times C and said decreasing ramped $i_{Bat}$ current has a magnitude about equal to 0.3 times said magnitude of said first stage charging current.

4. The battery cell charging system of claim 3 wherein said decreasing ramped $i_{Bat}$ current is a function of a final CC current ($CC_{Final}$), an initial CC current ($CC_{Init}$), a temperature limit of the battery cell, an impedance of the battery cell, and a rate of temperature change of the battery cell.

5. The battery cell charging system of claim 4 wherein said first charging stage ends at time $t_1$, wherein said third charging stage has a target time to begin at time $t_4$, and wherein said rate of temperature change produces a function Y(t) dependent upon $t_4-t_1$, said decreasing ramped $i_{Bat}$ current is directly related to:

$$\frac{CC_{Final} - CC_{Init}}{Y(t)}.$$

6. The battery cell charging system of claim 5 wherein said function Y(t) is included in a range from about $\frac{1}{2}(t_2+t_3)$ to about $\frac{5}{6}(t_2+t_3)$ wherein $t_4-t_1$ is less than $t_2+t_3$, wherein $t_2$ and $t_3$ are periods from a non-ramped four-stage charging profile for the battery cell, said four-stage charging profile having a CC first stage, a CV second stage, a CC third stage and a CV fourth stage, and wherein $t_2$ is a duration of said CV second stage and $t_3$ is a duration of said CC third stage.

7. A battery cell charging method for rapidly charging a lithium ion battery cell, the battery cell charging method comprising:
(a) applying, to the battery cell, a constant first stage charging current and an increasing battery cell voltage with said first stage charging current provided until said first stage charging voltage is about equal to a first stage complete voltage less than a maximum battery cell voltage; and thereafter
(b) applying, to the battery cell, a second ramped charging stage, said intermediate ramped charging stage including both an increasing ramped voltage and a decreasing ramped iBat current for the battery cell for the voltage charging range of said first stage complete voltage to about said maximum battery cell voltage, the ramped iBat current starting to decrease at the constant first stage charging current, wherein said second ramped charging stage has a sloe responsive to an imaginary resistance $R_{Bad}$ established for the batter cell; and thereafter
(c) applying, to the battery cell, a constant third stage charging voltage about equal to maximum battery cell voltage and a decreasing third stage charging current with said third stage charging voltage provided until said third stage charging current reaches a desired charge complete level.

8. The battery cell charging method of claim 7 wherein said second ramped charging stage includes a plurality of uniform stepwise voltage and current changes.

9. The battery cell charging method of claim 7 wherein said first stage charging current has a magnitude about equal to a number X times C and said decreasing ramped $i_{Bat}$ current has a magnitude about equal to 0.3 times said magnitude of said first stage charging current.

10. The battery cell charging method of claim 9 wherein said decreasing ramped $i_{Bat}$ current is a function of a final CC current ($CC_{Final}$), an initial CC current ($CC_{Init}$), a temperature limit of the battery cell, an impedance of the battery cell, and a rate of temperature change of the battery cell.

11. The battery cell charging method of claim 10 wherein said first charging stage ends at time $t_1$, wherein said third charging stage has a target time to begin at time $t_4$, and wherein said rate of temperature change produces a function $Y(t)$ dependent upon $t_4-t_1$, said decreasing ramped $i_{Bat}$ current is directly related to:

$$\frac{CC_{Final} - CC_{Init}}{Y(t)}.$$

12. The battery cell charging method of claim 11 wherein said function $Y(t)$ is included in a range from about $\frac{1}{2}(t_2+t_3)$ to about $\frac{5}{6}(t_2+t_3)$ wherein $t_4-t_1$ is less than $t_2+t_3$, wherein $t_2$ and $t_3$ are periods from a non-ramped four-stage charging profile for the battery cell, said four-stage charging profile having a CC first stage, a CV second stage, a CC third stage and a CV fourth stage, and wherein $t_2$ is a duration of said CV second stage and $t_3$ is a duration of said CC third stage.

13. A battery cell charging system, including a charger and a controller, for charging a lithium ion battery cell, the battery cell charging system comprising:

a circuit for charging the battery cell using an adjustable voltage charging-profile to apply a charging voltage and a charging current to the battery cell wherein said adjustable voltage charging-profile includes: a first charging stage with a constant first stage charging current and an increasing battery cell voltage with said first stage charging current provided until said first stage charging voltage is about equal to a first stage complete voltage less than a maximum battery cell voltage; a second charging stage, said second charging stage providing a substantially constant power profile for the battery cell for the voltage charging range of said first stage complete voltage to about said maximum battery cell voltage, wherein a ramped iBat current starts to decrease at the constant first stage charging current and has a slope responsive to an imaginary resistance $R_{Bad}$ established for the batter cell; and a third charging stage with a constant third stage charging voltage about equal to said maximum battery cell voltage and a decreasing third stage charging current with said third stage charging voltage provided until said third stage charging current reaches a desired charge complete level.

* * * * *